United States Patent
Christensen et al.

(10) Patent No.: US 6,304,865 B1
(45) Date of Patent: Oct. 16, 2001

(54) AUDIO DIAGNOSTIC SYSTEM AND METHOD USING FREQUENCY SPECTRUM AND NEURAL NETWORK

(75) Inventors: Alan K. Christensen; Christopher F. Broadbent, both of Austin, TX (US)

(73) Assignee: Dell U.S.A., L.P., Round Rock, TX (US)

( * ) Notice: Subject to any disclaimer, the term of this patent is extended or adjusted under 35 U.S.C. 154(b) by 0 days.

(21) Appl. No.: 09/179,303

(22) Filed: Oct. 27, 1998

(51) Int. Cl.[7] .............................. G06E 1/00; G06F 15/18
(52) U.S. Cl. ........................ 706/20; 704/232; 704/259
(58) Field of Search .......................... 706/20; 704/232, 704/259

(56) References Cited

U.S. PATENT DOCUMENTS

| | | | |
|---|---|---|---|
| 4,271,513 | 6/1981 | Maejima et al. | 714/716 |
| 4,430,530 | 2/1984 | Kandell et al. | 379/6 |
| 4,953,165 | 8/1990 | Jackson | 714/44 |
| 5,040,215 | 8/1991 | Amano et al. | 704/232 |
| 5,093,899 | 3/1992 | Hiraiwa | 706/25 |

(List continued on next page.)

OTHER PUBLICATIONS

Lo et al, "Phone–Based Speech Synthesis with Neural Network and Articulatory Control", ICSLP Proceedings of the 4th International Conference on Spoken Language, Oct. 1996.*

Chandrasekaran et al, "Speech Recognition Using Pulse Coupled Neural Network", IEEE Proceedings of the 13th Southeastern Symposium on System Theory, Mar. 1998.*

Kabre, H, "Robustness of a Chaotic Model Neural Network Applied to Audio—Visual Speech Recognition", Proceedings of the 1997 IEEE Neural Networks Workshop for Signal Processing, Sep. 1997.*

Filliatre et al, "Neural Network Speech Synthesis from Texts", World Congress on Neural Networks Conference, p. 79, 1996.*

(List continued on next page.)

*Primary Examiner*—George B. Davis
(74) *Attorney, Agent, or Firm*—Skjerven Morrill MacPherson LLP; Stephen A. Terrile (57) ABSTRACT

A method for testing an audio device with a trained neural network includes a loopback connector connecting the output port of the audio device to the input port of the audio device. A test signal is transmitted through the audio port and received at the input port. The test signal is converted into a frequency spectrum for analysis. The frequency spectrum is provided as input to a trained neural network, the neural network being previously trained to recognize the frequency spectrum pattern created by a properly working, or ideal, audio device. The neural network is trained by connecting the input port to the output port of an audio device from which the training is to occur. Prior to converting signals to a frequency spectrum, the waveform characteristics of the signal may be iteratively evaluated and recording levels adjusted so that the signal received has characteristics that can be tested by the neural network. The analyzed signal may be a portion of the signal received after analog to digital converters in the audio device have stabilized. The neural network generates a confidence level based on comparing the pattern of the tested audio device's frequency spectrum to the frequency spectrum of a working audio device. A pass value may be predetermined so that the tested audio device is reported as passing or failing the test by comparing the confidence level value generated by the system with the predetermined pass value.

24 Claims, 8 Drawing Sheets

U.S. PATENT DOCUMENTS

| | | | | |
|---|---|---|---|---|
| 5,119,469 | | 6/1992 | Alkon et al. | 706/25 |
| 5,150,323 | | 9/1992 | Castelaz | 708/801 |
| 5,163,111 | * | 11/1992 | Baji et al. | 706/20 |
| 5,175,794 | | 12/1992 | Tattersall | 704/200 |
| 5,185,848 | | 2/1993 | Aritsuka et al. | 704/202 |
| 5,285,498 | | 2/1994 | Johnston | 381/2 |
| 5,297,237 | | 3/1994 | Masouka et al. | 706/25 |
| 5,343,251 | * | 8/1994 | Nafeh | 348/571 |
| 5,381,512 | * | 1/1995 | Holton et al. | 704/200.1 |
| 5,408,588 | | 4/1995 | Ulug | 706/25 |
| 5,464,428 | | 11/1995 | Hill | 607/1 |
| 5,557,741 | | 9/1996 | Jones | 714/43 |
| 5,563,982 | * | 10/1996 | Wang et al. | 706/20 |
| 5,581,658 | * | 12/1996 | O'Hagan et al. | 706/20 |
| 5,619,616 | * | 4/1997 | Brady et al. | 706/20 |
| 5,623,579 | * | 4/1997 | Damiano et al. | 706/17 |
| 5,625,743 | | 4/1997 | Fiocca | 704/205 |
| 5,666,466 | * | 9/1997 | Lin et al. | 704/246 |
| 5,715,367 | * | 2/1998 | Gillick et al. | 704/254 |
| 5,752,221 | | 5/1998 | Sugiyama et al. | 704/201 |
| 5,787,393 | | 7/1998 | Inazumi | 704/232 |
| 6,119,083 | * | 9/2000 | Hollièr et al. | 704/243 |

OTHER PUBLICATIONS

Leija et al, "A System on Text Reading and Translation to Voice for Blind Persons", IEEE 18th Annual International Conference on Medicine and Biology Society, Oct.–Nov. 1996.*

Chaiyan Suwancheewasiri, "Speaker Dependent Thai–Numeral Recognition by Neural Network" http://202.28.17.1/thes/engineer/MEE/meeoose.html, 1996.*

Donald R. Tveter, "The Backprop Algorithm," *Back–Propagation,* 1995, pp. 1–12.

Don Cross, "Fast Fourier Transforms," Discrete Fast Fourier Transforms, Jul. 7, 1998 (downloaded Aug. 6, 1998 from http://www.intersrv.com/~dcross/fft.html), 6 pages.

Teresia Ramdén, "The Back–propagation Algorithm," Oct. 1, 1996, (downloaded Aug. 6, 1998 from http://hydra.ikp.liu.se/~terra/Licin1/node6.html), 3 pages.

Teresia Ramdén, "Neural Networks," Oct. 1, 1996 (downloaded Aug. 6, 1998 from http://hydra.ikp.liu.se/~terra/Licin1/node5.html) 4 pages.

Teresia Ramdén, "The Complex Algorithm," Oct. 1, 1996 (downloaded Aug. 6, 1998 from http://hydra.ikp.liu.se/~terra/Licin1/node7.html) 2 pages.

* cited by examiner

AUDIO DIAGNOSTIC SYSTEM AND METHOD USING FREQUENCY SPECTRUM AND NEURAL NETWORK

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

BACKGROUND

1. Field

This field relates to diagnostic tests for audio cards used in computers.

2. Description of the Related Art

Computer systems in general and International Business Machines (IBM) compatible personal computer systems in particular have attained widespread use for providing computer power to many segments of today's modem society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices. Computers producing multimedia effects (e.g., sound coupled with visual images) are in increased demand as computers are used for artistic endeavors, for entertainment, and for education. Sound makes game playing more realistic and helps reinforce knowledge and make educational programs more enjoyable to use. Digital effects and music can also be created on the computer and played through attached speakers without the need for additional musical instruments or components.

Multimedia systems today often include audio devices (e.g., sound cards) connected to the computer to which speakers can be attached for playing music and other sound effects. Testing and diagnosis of these audio devices poses challenges in modem computer manufacturing and repair facilities. Currently, the technician attaches speakers to the audio device and invokes a test procedure that plays music or a test pattern on the speakers and listening to the result.

A challenge of testing and diagnosing audio devices by listening to the result is that the area is often noisy and difficult to distinguish one system being tested from another. In addition, human error, which may be caused by repetitively listening to numerous systems may cause the technician to pass an audio device which would otherwise fail. Finally, to be done well, the technician must listen to a variety of sounds to ensure that the audio device is working properly which is time consuming and can effect the throughput of the manufacturing facility.

Automated methods have been used to test audio devices such as sound cards. Audio devices have also been tested using a loopback connector connecting the input and output ports of the audio device. These prior methods involved recording simple sine waves across the audio device and checking for a sine wave match (i.e., zero crossing at the same point for the input and output sine waves) or by using a frequency domain, such as a Fast Fourier Transform ("FFT"), analysis to check the sine wave. Other methods of testing an audio device have recorded a square wave and charting the periodic changes in the recorded data. The challenges posed by these prior methods is that they did not allow for much, if any, variance in the results obtained leading to many false failures. If, for example, the zero crossing did not occur at precisely the right position, the audio device did not pass the given test even though the audio device may be within specifications and qualitatively sound in operation. False positives may lead to increased diagnostic time using a human technician to listen to output from the audio device only to eventually determine that the audio device was suitable for shipment to a customer.

An improvement to the testing and diagnosis of audio devices is needed which removes the need for technicians to manually listen to sounds generated from such devices and which also allows for variances to improve the fault tolerance of automated test systems.

SUMMARY

The audio testing and diagnostic method of the present invention trains a neural network based upon an actual working audio device. The audio device is configured so that a line from the output port loops back into an input port. A test signal is transmitted through the audio port and received at the input port. The test signal is then converted into a frequency spectrum for analysis. The frequency spectrum is provided as input to a trained neural network, the neural network being previously trained to recognize the frequency spectrum pattern created by a properly working, or ideal, audio device. The neural network is trained by connecting the input port to the output port of an audio device from which the training is to occur, i.e., a properly working audio device. A signal is transmitted through the output port and received from the input port. The signal is converted to a frequency spectrum which is provided as input to train the neural network. Training the neural network results in weighted values associated with neurons, the neurons being arranged into a neural network topology. The weighted values and topology are stored in the trained neural network so that the trained neural network can test other audio cards. The audio device may include both sound cards, modems, or other sound generating devices. Converting signals to a frequency spectrum may be computed using a fourier transform. Prior to converting signals to a frequency spectrum, the waveform characteristics of the signal may be iteratively evaluated and recording levels adjusted so that the signal received has characteristics that can be tested by the neural network. In addition, the signal that is analyzed may be a portion of the signal so that analog to digital converters in the audio device have stabilized before the portion of the signal is taken. The neural network generates a confidence level based on a comparison of the pattern of the tested audio device's frequency spectrum to the frequency spectrum of a working audio device. A pass value may be predetermined so that the tested audio device is reported as passing or failing the test by comparing the confidence level value generated by the system with the predetermined pass value.

The computer system of the present invention gains the same advantages as the method by including a processor, memory, and an audio device with an input and output port into a computer system. A connector is provided to connect the input and output ports. A signal generator generates a signal from the output port which, in turn, is received at the input port by a signal receiver. A frequency converter, which may use a fourier transform, converts the received signal to a frequency spectrum. A trained neural network analyzes the frequency spectrum to generate a confidence level.

BRIEF DESCRIPTION OF THE DRAWINGS

The present invention may be better understood, and its numerous objects, features, and advantages made apparent to those skilled in the art by referencing the accompanying drawings.

FIG. 1 is a front view of a computer system with speakers attached.

FIG. 2 is a rear view of a computer system with speakers attached.

FIG. 3a is a perspective view of an audio device and a loopback connector.

FIG. 3b is a rear view of a computer system with an audio device and loopback connector.

FIG. 4 is a flow chart of testing an audio device using a neural network.

FIG. 5 is a flow chart of the neural network being trained.

FIG. 6a is a diagram of a three-layered neural network.

FIG. 6b is a diagram of a node in a neural network receiving weighted input.

FIG. 7 is a block diagram of a neural network being trained using frequencies of an audio card as an input vector.

FIG. 8 is a block diagram of a trained neural network testing an audio device.

The use of the same reference symbols in different drawings indicates similar or identical items.

DESCRIPTION OF THE PREFERRED EMBODIMENT(S)

Figure 1:
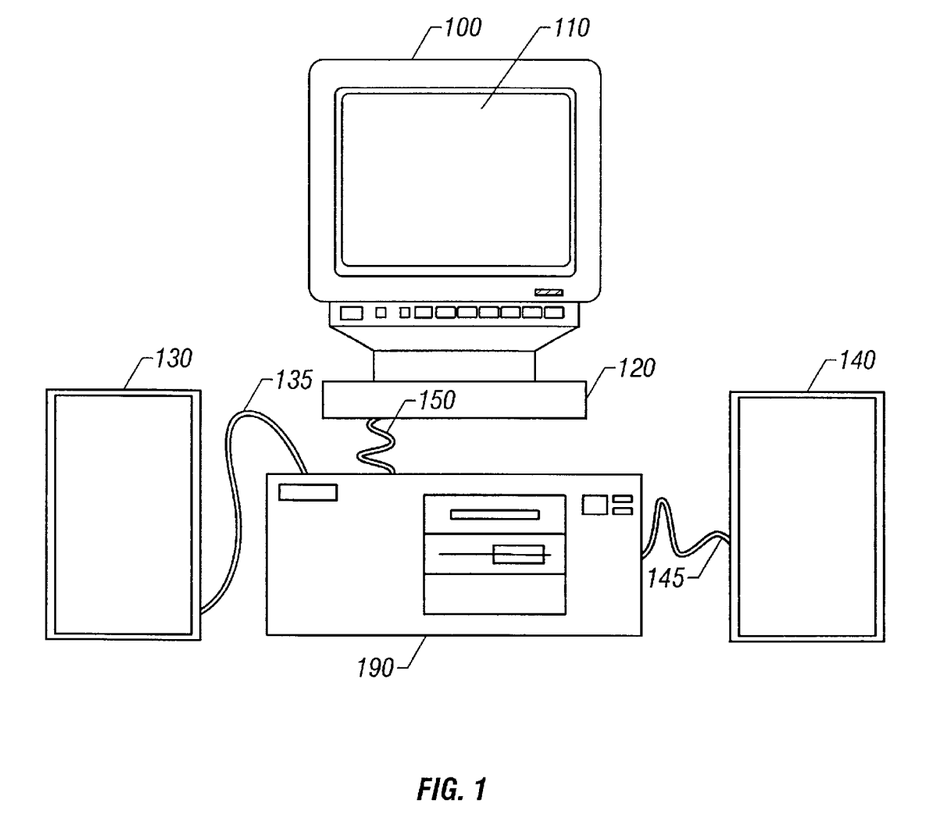

FIG. 1 shows a monitor 100 including a display screen 110 and a monitor base 120 connected to computer system unit 190 with video cable 150. Computer system unit 190 is shown having left speaker 130 and right speaker 140 connected to computer system unit 190 by left speaker cable 135 and right speaker cable 145, respectively.

Figure 2:
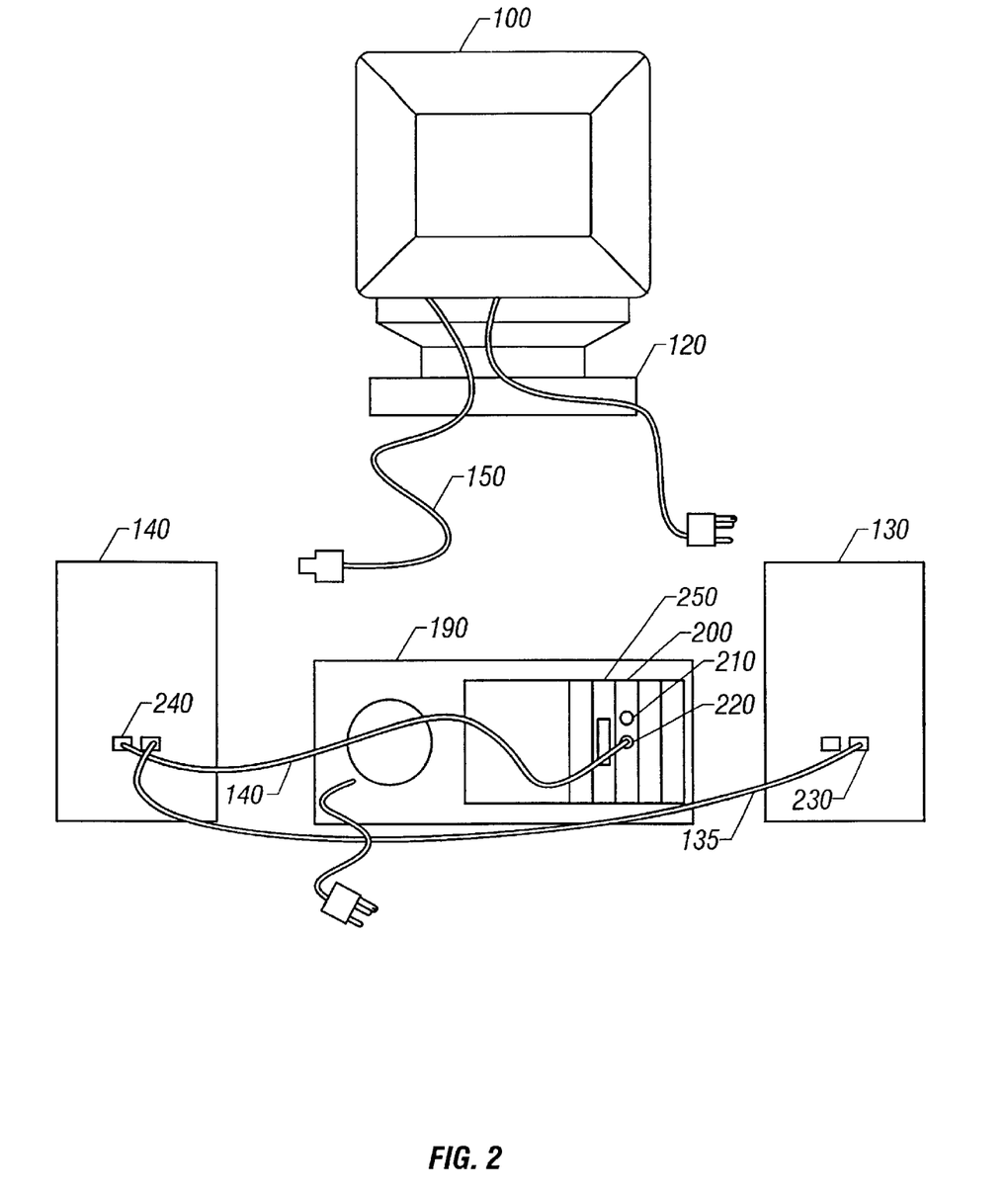

Turning to FIG. 2, audio card 200 is shown being the device within computer system unit 190 actually connected to left speaker 130 and right speaker 140. Audio card 200 includes an input audio jack 210 and an output audio jack 220. The output audio jack 220 is used to connect left speaker cable 135 and right speaker cable 145 to left speaker 130 and right speaker right speaker 140. The input audio jack 210 is commonly used to connect a microphone or other audio input device to audio card 200. All elements shown in FIGS. 1 and 2 are conventional elements used in personal computer systems. As used herein, an audio device includes devices that create audible sounds, including but not limited to sound cards and modems.

Figure 3A:
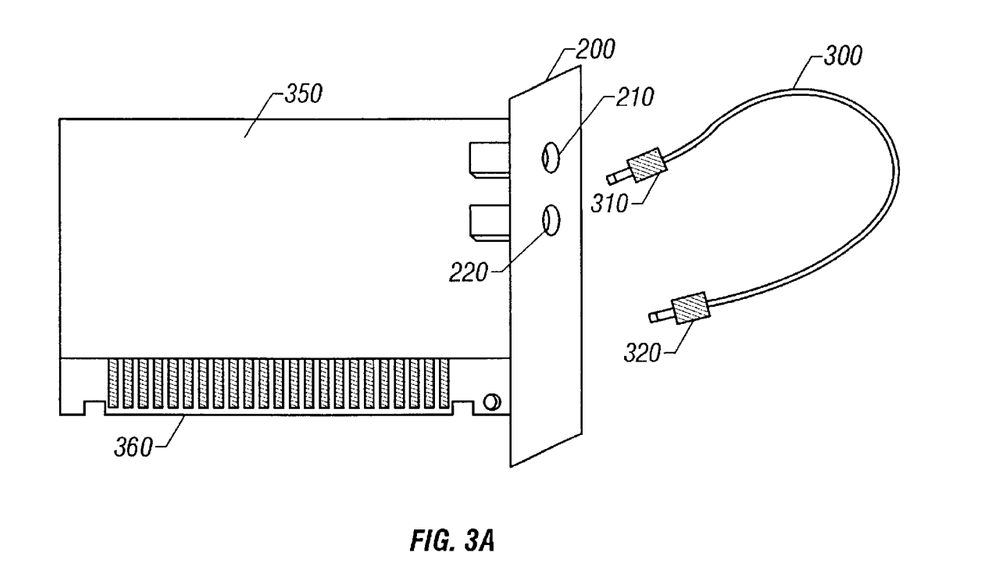
Figure 3B:
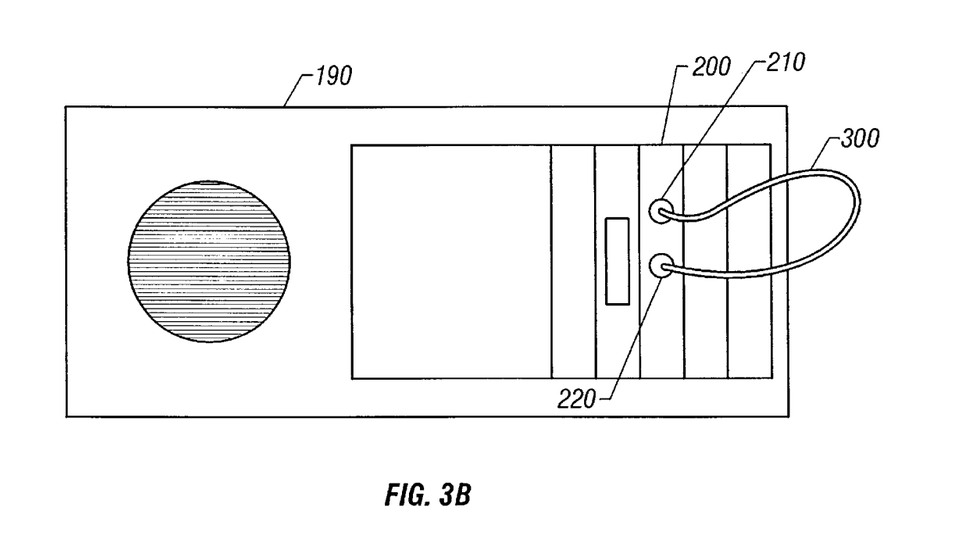

FIGS. 3a and 3b show the audio card 200 connected to conventional loopback connector 300. Loopback connector 300 includes a loopback connector input plug 310 and a loopback connector output plug 320. As loopback connector 300 is a straight through cable, the ends (310 and 320) of the loopback connector 300 can be switched so that either end can be the input end of the loopback connector 300 and either end can be the output end. FIG. 3a shows an audio card 200 which has been removed from computer system unit 190. Audio card 200 conventionally includes audio card circuitry 350 and audio card connector pins 360 in addition to input audio jack 210 and output audio jack 220. Audio card connector pins 360 are used to connect audio card 200 to a board within computer system unit 190. Other components commonly found on audio devices, such as volume controls, are not shown on audio card 200 but may be included as well. As will be appreciated by those skilled in the art, a modem could be tested by connecting one end of loopback connector 300 to output port of the modem (line out). As both audio cards and modems operate in the audio frequency, the neural network disclosed herein could be used to test and diagnose modems as well as audio cards.

FIG. 3b shows the back of computer system unit 190 when loopback connector 300 is deployed. Rather than output audio jack 220 connecting to left speaker 130 and right speaker 140, it now connects directly to input audio jack 210. In this fashion, signals sent to output audio jack 220 are immediately received at input audio jack 210 so that the audio card 200 is isolated to determine if it is operating within tolerances. Signals sent through output audio jack 220 and received at input audio jack 210 can be analyzed to determine whether audio card 200 is operating satisfactorily. In order to conduct such test, a testing program is invoked to prepare the audio card 200 for testing and execute a neural network to compare the test signal to a desired signal.

Figure 4:
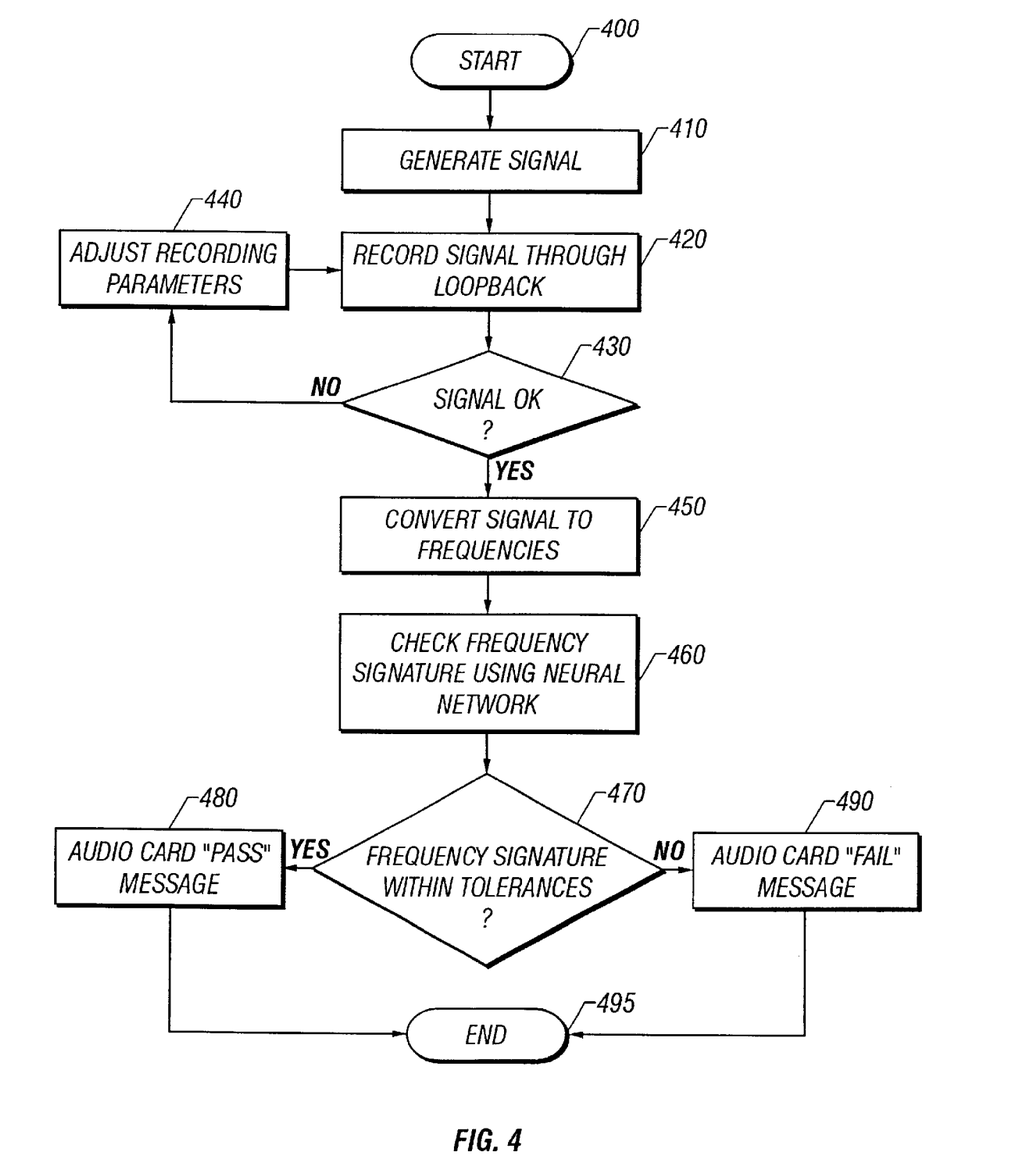

Turning now to FIG. 4, a flowchart is shown depicting the testing done by the testing program operating on computer system unit 190. At program invocation step 400, the testing program is invoked. In order to test accurately, loopback connector 300 is placed between output audio jack 220 and input audio jack 210 (as shown in FIGS. 3a and 3b). At generate signal step 410, a test signal is generated. In one embodiment, the testing program sends a record test signal through loopback step 420 which utilizes audio card 200 to record the test signal to ensure at signal verification step 430 that parameters such as volume are adjusted appropriately. Data is acquired at a time after the analog to digital (A/D) converters on audio card 200 have stabilized. The numbers representing the digital test signal are examined for reasonable values without a detailed examination of the waveform. For example, if many of the numbers are at the top and bottom of the range of possible values then it is likely that the volume on audio card 200 is set too high and should be reduced. In like fashion, a similar test could be performed to determine if the numbers are too low to be a reasonable signal, as would be the case if the loopback connector 300 is not properly connected between output audio jack 220 and input audio jack 210. If the recording parameters are not within acceptable ranges, then the program iterates the record signal through loopback step 420, signal verification step 430, and adjust recording parameters step 440 until acceptable recording parameters are achieved. Once the recording parameters are acceptable, convert signal to frequencies step 450 is performed converting the test signal into frequencies.

In one embodiment, the convert signal to frequencies step 450 is accomplished using a Fast Fourier Analysis, as is known in the art for converting signals into frequencies. The result of the convert signal to frequencies step 450 is an array of numbers representing the power of the recorded test signal at fixed frequency intervals. In one embodiment, the array is scaled in a linear fashion so that the largest power value is a known constant, for example 1.00000.

Figure 5:
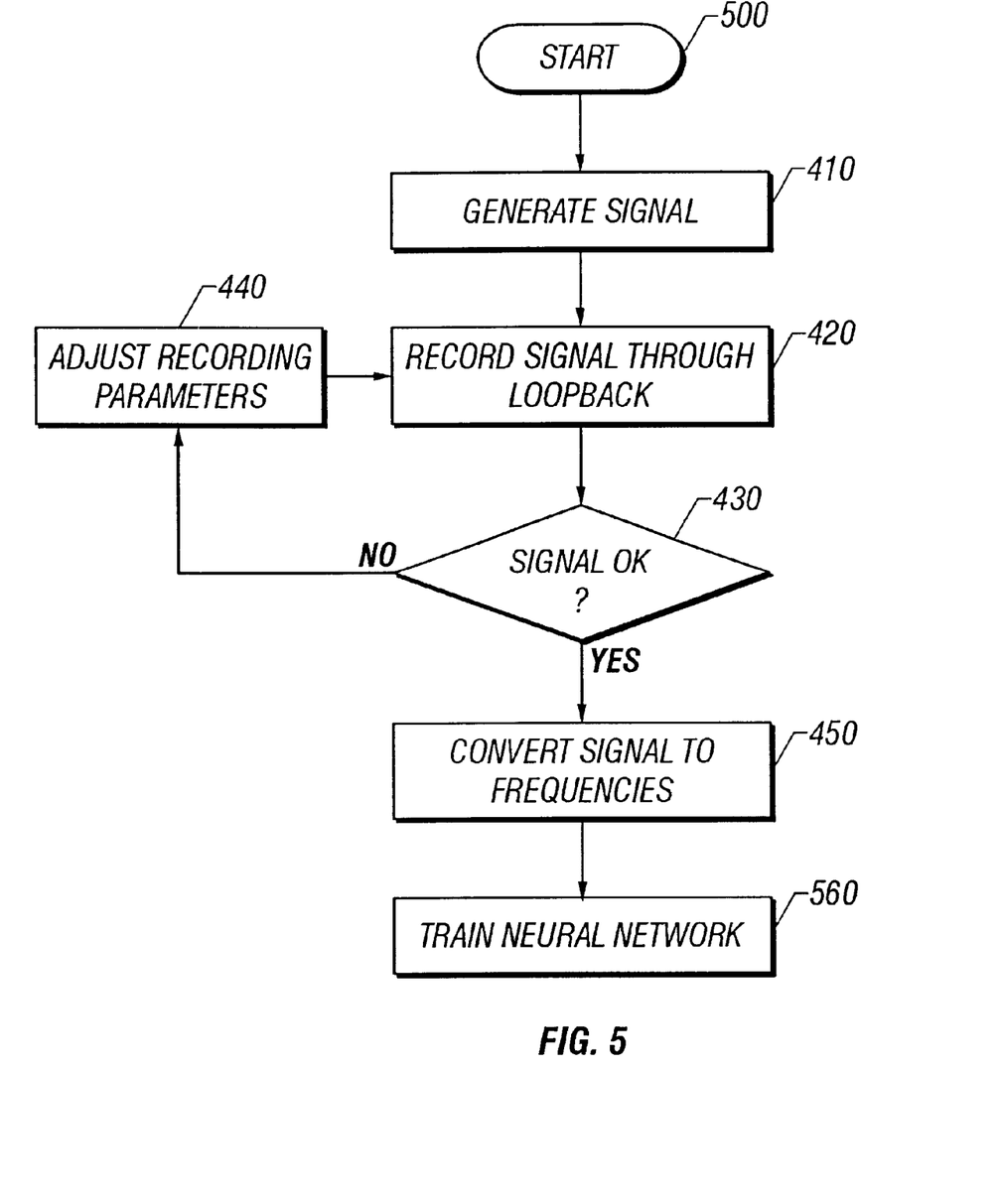

In the check frequency signature step 460, the frequency spectrum created from the test signal is tested by a neural network. The neural network employed must be first trained on an audio card 200 known to operate as desired (i.e., within specifications, optimally, etc.). Neural networks are known as a method of programmatically implementing pattern recognition routines by computer. The training of the neural network is shown in FIG. 5. During check frequency signature step 460, the scaled array of linear values is presented as an input to the neural network. The scaled array of linear values are processed by layers of the trained neural network to produce a confidence value. The confidence value corresponds to the level of confidence the neural network has in the correctness of the recorded signal. Tolerances can be established in light of the confidence value to indicate to the technician whether the audio card "passed" or "failed." In one embodiment, the confidence value has a range from 0 to 1.0000 and a tolerance level established at 0.80000. At frequency verification step 470 the confidence value output from the neural network is compared to a pre-assigned tolerance level such as 0.80000. If the confidence value output from the neural network is greater than or equal to 0.80000 then audio card "pass" message 480 is displayed to the technician. On the other hand, if the confidence value output from the neural network is less than 0.80000 then audio card "fail" message 490 is displayed to the technician. After displaying either the audio card "pass" message 480 or audio card "fail" message 490, the testing program terminates at program termination step 495.

Turning to FIG. 5, this flowchart shows the neural network being trained in order to test and evaluate audio card 200. In order to train the neural network, the audio card 200 used to train the neural network is evaluated as being "good" by methods independent of the neural network program. This is because the neural network program "learns" what a "good" card is by recording and storing frequencies for use in future tests. If a "bad" audio card 200 is used for training the neural network, then the neural network deems such bad values resulting from the "bad" audio card 200 to be the desired results. The testing of audio card 200 independently of the neural network is performed using subjective measures, such as human hearing, or using other testing mechanisms, such as oscilloscopes, to analyze the signals emanating from audio card 200. Once an audio card is identified as a model audio card, the neural network is "trained" using this audio card. This training is initiated at training invocation step 500.

In order to train the neural network, loopback connector 300 is placed to connect output audio jack 220 to input audio jack 210 (as shown in FIGS. 3a and 3b). In one embodiment, the generation of a suitable test signal follows using the same steps (410 to 440) as performed in the testing flowchart shown in FIG. 4. Once the recording parameters are acceptable, convert signal to frequencies step 450 is performed converting the test signal into a frequency spectrum.

The frequency spectrum is used as an input signal to the neural network program during train neural network step 560. Because this audio card 200 was independently verified as having qualitatively and quantitatively desired characteristics, the digital signature is assigned a confidence value of 01.0000. The trained neural network is viewed as a digital signature of an ideal audio card. When testing of other audio cards 200 occurs, the audio card 200 is compared with the digital signature of the ideal audio card. The closer the audio card 200 is to the ideal audio card, the closer the confidence value is to 1.0000. For example, a 0.99787 confidence value may be defined to indicate that the audio card 100 tested compares closely with the ideal audio card and is therefore acceptable to send to a customer. On the other hand, a lower confidence value, such as 0.1233 may be defined to indicate that either the loopback connector 300 is not properly installed (skewing the results) or the audio card tested is defective. The trained neural network program can be placed on a diagnostic diskette or other form of media be executed by a number of computers that include the particular type of audio card. As audio cards vary from one another in terms of performance and operating characteristics, a new trained neural network, or digital signature, should be made for each type of audio card for testing of that particular type of audio card. The trained neural network can also be used in a test fixture to test other audio cards, such as might be found in a manufacturing environment.

Figure 6A:
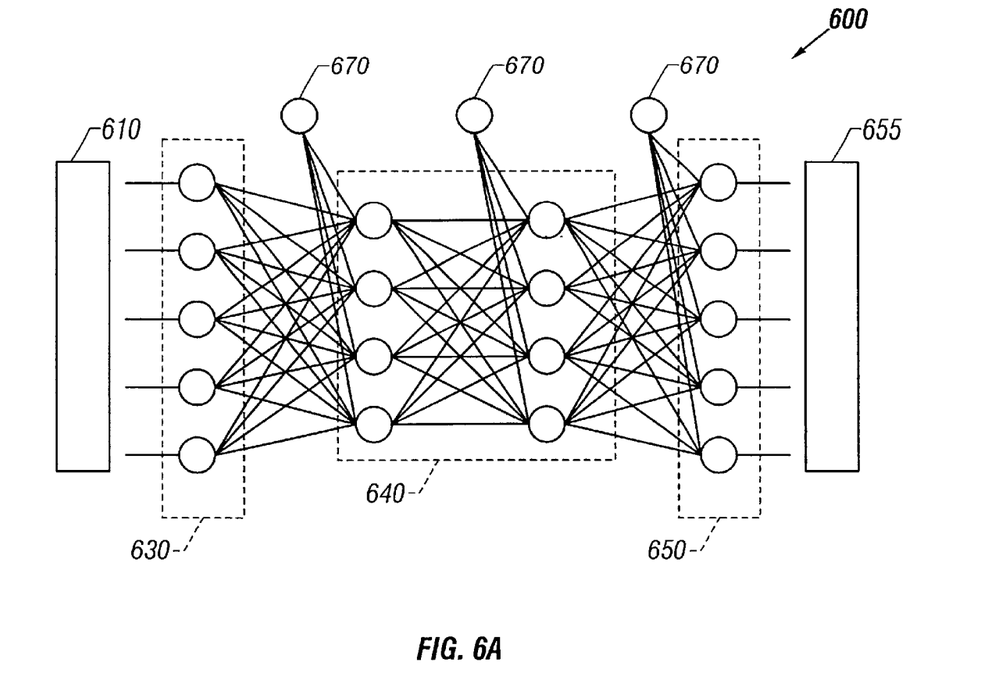

FIG. 6a shows a three-layer neural network as used in one embodiment of the present invention. Input vector 610 is the frequency array resulting from the convert signal to frequencies step 450 and provides input to input layer 630 of neural network 600. The neural network includes many neurons (a single neuron is represented by a circle in FIG. 6a and further shown in FIG. 6a) which are organized into layers. The input layer 630 receives input from the input vector 610. Each neuron of the input layer 630 provides data to each of the neurons in the next layer of neurons, the lines between neurons depicting data provided from one neuron in one layer to one neuron in the next layer. After the input layer 630 are hidden layers 640. In the embodiment shown in FIG. 6a, two hidden layers are shown to form a three-layer neural network. The last hidden layer 645 provides data to the output layer 650. The output layer 650 produces an output vector 655. Each neuron within the neural network 600 receives inputs from the previous layer. Each neuron other than those in the input layer 630 also receives input from constant bias 670. Each of these inputs are individually multiplied by unique, adjustable weights and then summed to become the input of the transfer function for this particular neuron. The result from the transfer (activation, gain, or squashing) function is passed to the neurons in the next layer. Transfer functions can be step functions (from 0 to 1 or from −1 to 1), the sigmoid function (from 0 to 1 or from −1 to 1), or simply a linear function. In one embodiment of the present invention, the sigmoid function is used. Other common neural network configurations other than the three-layer neural network depicted in FIG. 6a include recurrent networks where connections between two neurons are allowed in both directions and even from a given neuron to itself, and self-organizing neural networks which will discover patterns, regularities, correlations, categories and the like in the input data. Self organizing neural networks are often used in unsupervised learning environments.

In one embodiment of the present invention, the output vector 655 is a single neuron which will have a value calculated that represents the confidence value for the audio card being tested. In one embodiment of the present invention, the neural network is trained using a back propagation algorithm. The back propagation algorithm is useful in training multi-layered networks. The weights associated with each neuron are established following such training and such weights are stored with the net topology. After training, the input values generated during a test of audio card 200 would be multiplied by the weights established during the training of the neural network, however no new training occurs during such tests.

Figure 6B:
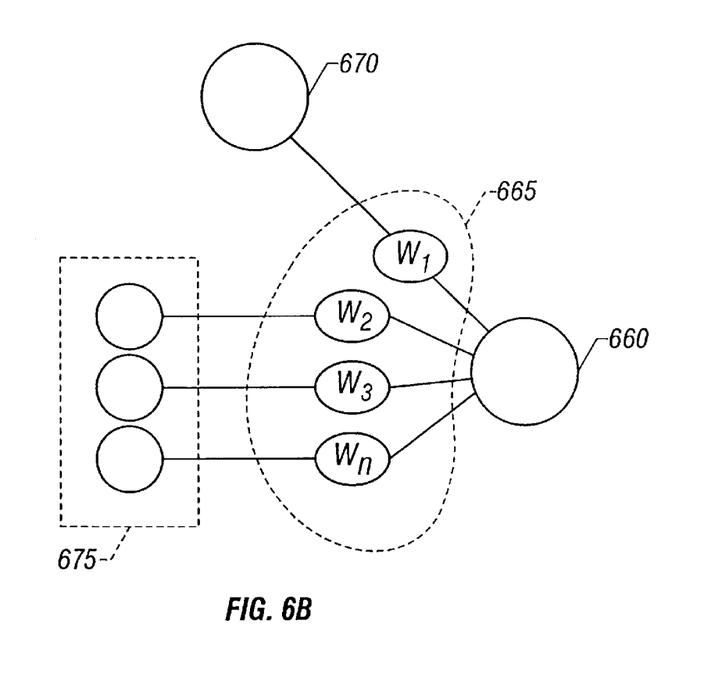

FIG. 6b shows a more detailed view of a single neuron 660 receiving weighted input from a previous level 675 and a constant bias 670. Input from the previous level 675 and constant bias 670 are multiplied by weighted values 665. These weighted values 665 were determined during training of the neural network and remain fixed during the testing process. The products of the weighted values and the respective previous level 675 cells (and constant bias 670) are supplied to single neuron 660. Single neuron 660 performs a function on the supplied products, the result of the function being a single result which in turn is passed to neurons in subsequent layers. During training, the trained neural network retains the topology of neural network 600 as shown in FIG. 6a as well as the weighted values 665 for each neuron in the neural network topology.

Figure 7:
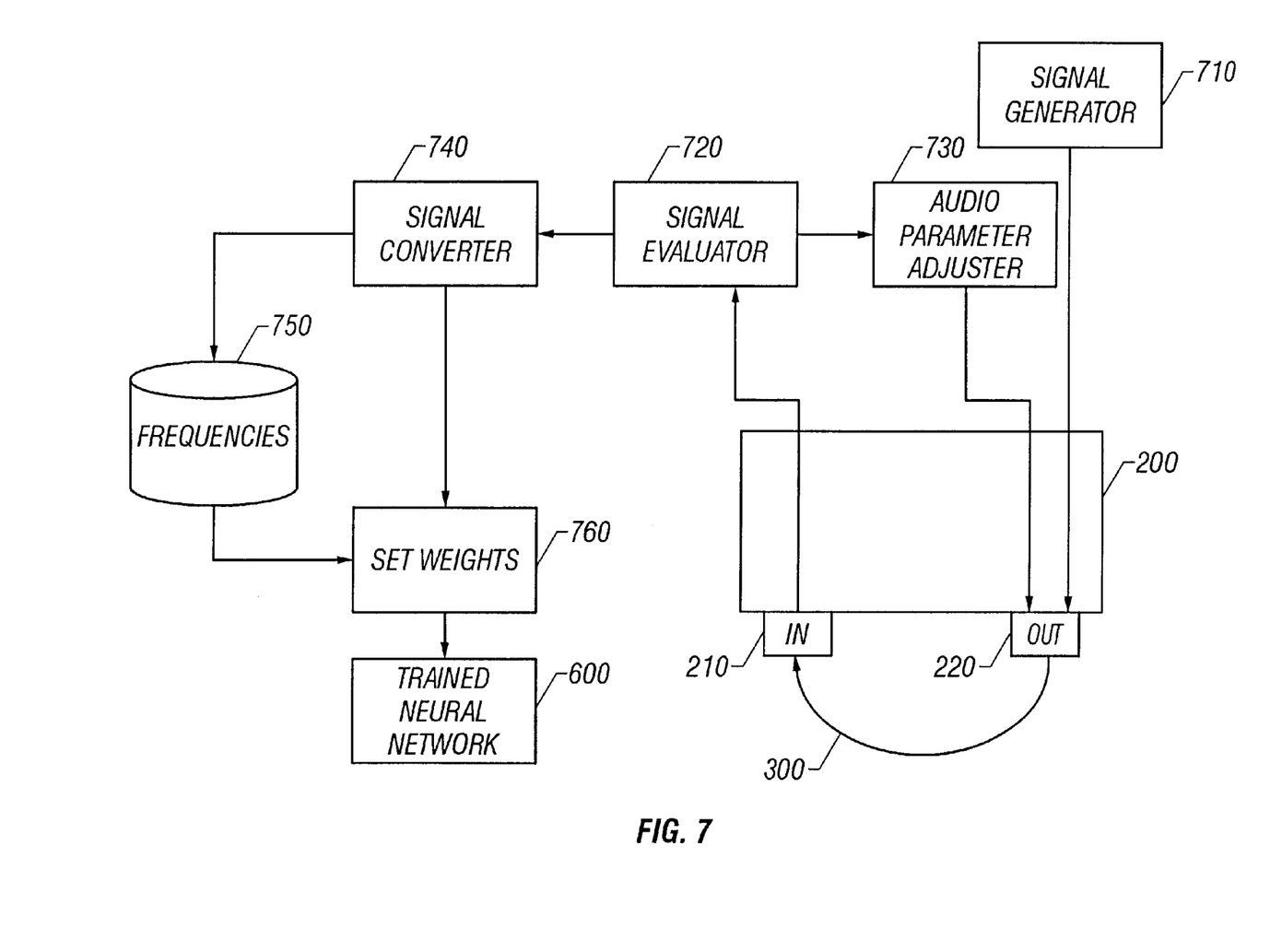

FIG. 7 shows a block diagram of a system training neural network 600 and using audio card 200. Signal generator 710 supplies a signal to audio card 200 which is transmitted out of output audio jack 220, through loopback connector 300 and back into input audio jack 210 of audio card 200. Signal evaluator 720 receives the signal as received from audio card 200 and evaluates the signal for general characteristics, such as suitable volume. If the signal does not have proper characteristics, audio parameter adjuster 730 operates to adjust the recording parameters of audio card 200 and send the signal back through audio card 200 until proper recording parameters are attained.

Once proper recording parameters are attained and a signal with proper characteristics is recorded, signal evaluator 720 sends the signal to signal converter 740. Signal converter 740 converts the signal into an array of frequencies using a Fast Fourier Transform or other method for converting signals to frequencies as will be appreciated by those skilled in the art. The array of frequencies 750 are used to set weights 760 corresponding to nodes of the trained neural network 600. Once the weights are set, the trained neural network is created that will be able to analyze audio card 200 to determine if it is working properly.

Figure 8:
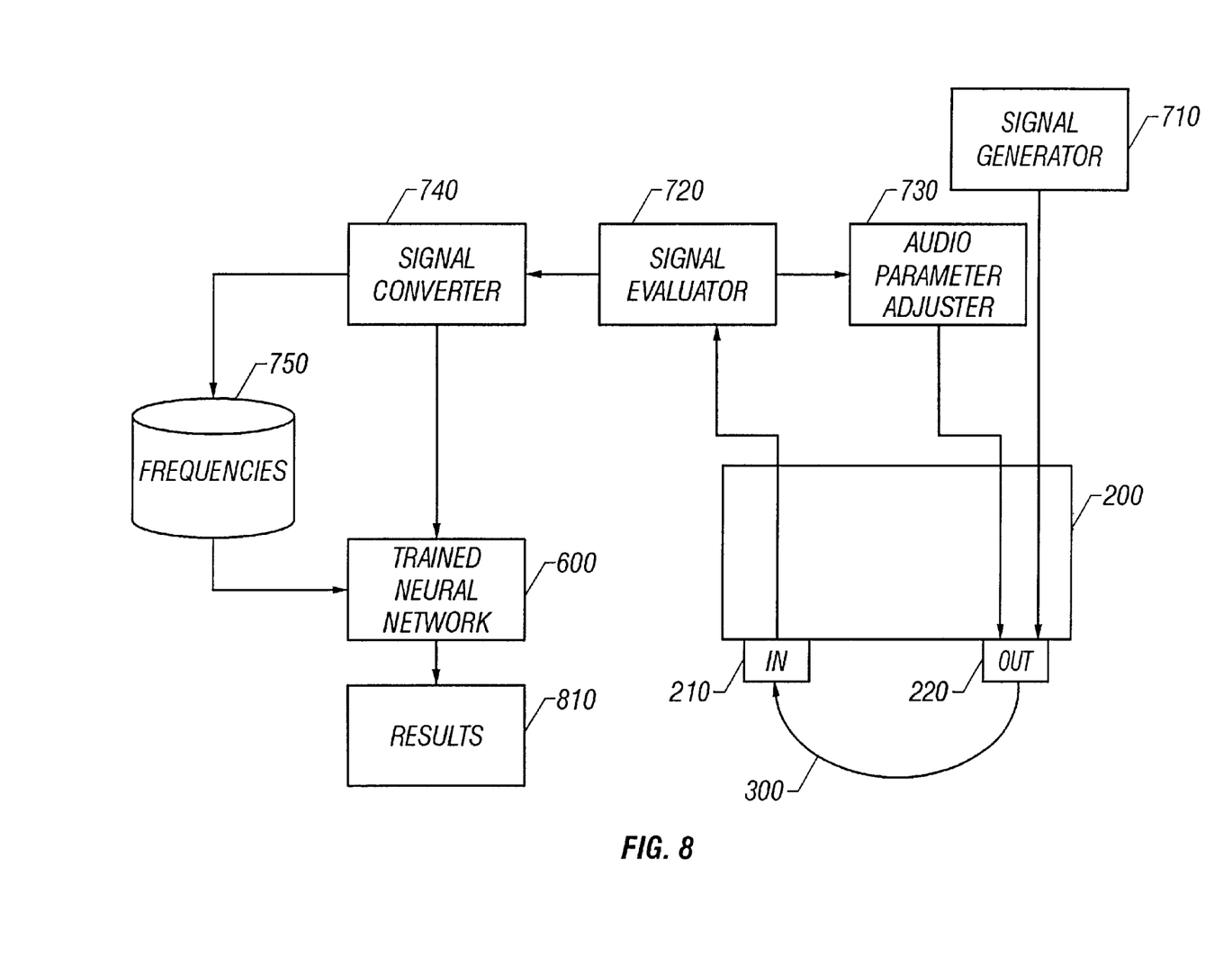

In one embodiment, a trained neural network 600 is created for each type of audio card 200 that is tested. As shown in FIG. 8, the trained neural network can be transferred by magnetic medium, i.e., floppy diskettes, to other computer systems to test the audio cards attached to such other computer systems. For example, if a certain model of a SoundBlaster™ brand audio card needs to be tested, it would first be advisable to create a trained neural network for an ideal SoundBlaster™ brand audio card with the same model type. That particular trained neural network 600 could then be used to test any number of that model type of SoundBlaster brand audio card without needing to retrain the neural network. As will be appreciated by those skilled in the art, several iterations of training may be needed to result in trained neural network 600. In addition, a trained neural network could be created for a particular model type of modem. Once trained, neural network 600 could be used to test any number of modems.

FIG. 8 shows testing of audio card 200 using the trained neural network 600 shown being created in FIG. 7. The signal is generated, evaluated, and converted to frequencies using the same components and process used in training in FIG. 7 as described above. However, frequencies 750 obtained during testing are fed as the input vector 610 (shown in FIG. 6a) to trained neural network 600. Trained neural network 600 evaluates frequencies 750 and generates an output vector 650 (shown if FIG. 6a). Results 810 of the output vector can then be displayed to the user or technician indicating whether audio card 200 passed or failed the test. Attached hereto as a microfiche appendix is a particular embodiment of a neural network program coded in the C++ programming language. The code is

What is claimed is:

1. A method of testing a modem, said method comprising:
   connecting an input port of a sound card to an output port of the modem;
   transmitting a test signal through the output port;
   receiving the test signal from the input port;
   converting the received test signal to a frequency spectrum;
   providing the frequency spectrum as input to a trained neural network; and
   determining whether the modem is operable from results generated by the trained neural network.

2. The method, as recited in claim 1, wherein the connecting step further includes inserting one end of a pass through cable into the input port and inserting the other end of the pass through cable into the output port.

3. The method, as recited in claim 1, wherein the frequency spectrum is computed using a fourier transform transforming the signal into an array of values representing the power of the signal at fixed frequency intervals, and wherein the providing step provides the array of values as input to the trained neural network.

4. The method, as recited in claim 1, further comprising evaluating waveform characteristics of the signal received from the input port, adjusting recording parameters on the audio device, and selectively resending the signal through the output port in response to the evaluating.

5. The method, as recited in claim 1, further comprising:
   comparing a predetermined pass value with a confidence level value, wherein the confidence level value is calculated during the determining the operability;
   displaying a result from the comparing on a display device, wherein the result informs a user whether the confidence level value is greater than the predetermined pass value.

6. The method, as recited in claim 1, wherein the converting step converts a portion of the signal, the portion of the signal taken after analog to digital converters on the audio device have stabilized.

7. The method, as recited in claim 1, wherein the trained neural network includes a plurality of neurons and wherein the plurality of neurons are organized into a plurality of neuron layers.

8. The method, as recited in claim 1, wherein the plurality of neuron layers include one input layer, a plurality of hidden layers, and one output layer.

9. An apparatus for testing a modem, the apparatus comprising:
   a computer readable medium;
   means for connecting an input port of a sound card to an output port of the modem;
   means for transmitting a test signal through the output port;
   means for receiving the test signal from the input port;
   means for converting the received test signal to a frequency spectrum;
   means for providing the frequency spectrum as input to a trained neural network; and means for determining whether the modem is operable from results generated by the trained neural network, the means for determining being stored on the computer readable medium.

10. The apparatus, as recited in claim 9, wherein the means for connecting further includes means for inserting one end of a pass through cable into the input port and means for inserting the other end of the pass through cable into the output port.

11. The apparatus, as recited in claim 9, wherein the frequency spectrum is computed using a fourier transform transforming the signal into an array of values representing the power of the signal at fixed frequency intervals, and wherein the means for providing provides the array of values as input to the trained neural network.

12. The apparatus, as recited in claim 9, further comprising means for evaluating waveform characteristics of the signal received from the input port, means for adjusting recording parameters on the audio device, and means for selectively resending the signal through the output port in response to the means for evaluating.

13. The apparatus, as recited in claim 9, further comprising:

means for comparing a predetermined pass value with a confidence level value, wherein the confidence level value is calculated during the determining the operability;

means for displaying a result from the comparing on a display device, wherein the result informs a user whether the confidence level value is greater than the predetermined pass value.

14. The apparatus, as recited in claim 9, wherein the means for converting converts a portion of the signal, the portion of the signal taken after analog to digital converters on the audio device have stabilized.

15. The apparatus, as recited in claim 9, wherein the trained neural network includes a plurality of neurons and wherein the plurality of neurons are organized into a plurality of neuron layers.

16. The apparatus, as recited in claim 9, wherein the plurality of neuron layers include one input layer, a plurality of hidden layers, and one output layer.

17. A computer system for testing a modem, the computer system comprising:

a processor;

memory operatively coupled to the processor;

an audio device, wherein the audio device includes an input port and an output port;

a connector that connects the output port to the input port;

means for transmitting a test signal through the output port;

means for receiving the test signal from the input port;

means for converting the received test signal to a frequency spectrum;

means for providing the frequency spectrum as input to a trained neural network; and means for determining whether the modem is operable from results generated by the trained neural network, the means for determining being stored on the computer readable medium.

18. The computer system, as recited in claim 17, wherein the connector further includes a pass through cable.

19. The computer system, as recited in claim 17, wherein the frequency spectrum is computed using a fourier transform transforming the signal into an array of values representing the power of the signal at fixed frequency intervals, and wherein the means for providing provides the array of values as input to the trained neural network.

20. The computer system, as recited in claim 17, further comprising means for evaluating waveform characteristics of the signal received from the input port, means for adjusting recording parameters on the audio device, and means for selectively resending the signal through the output port in response to the means for evaluating.

21. The computer system, as recited in claim 17, further comprising:

means for comparing a predetermined pass value with a confidence level value, wherein the confidence level value is calculated during the determining the operability;

means for displaying a result from the comparing on a display device, wherein the result informs a user whether the confidence level value is greater than the predetermined pass value.

22. The computer system, as recited in claim 17, wherein the means for converting converts a portion of the signal, the portion of the signal taken after analog to digital converters on the audio device have stabilized.

23. The computer system, as recited in claim 17, wherein the trained neural network includes a plurality of neurons and wherein the plurality of neurons are organized into a plurality of neuron layers.

24. The computer system, as recited in claim 17, wherein the plurality of neuron layers include one input layer, a plurality of hidden layers, and one output layer.

* * * * *